Feb. 8, 1966  H. D. FOWLIE  3,233,535
CENTRIFUGAL COFFEE BREWER
Filed Dec. 27, 1962  2 Sheets-Sheet 1
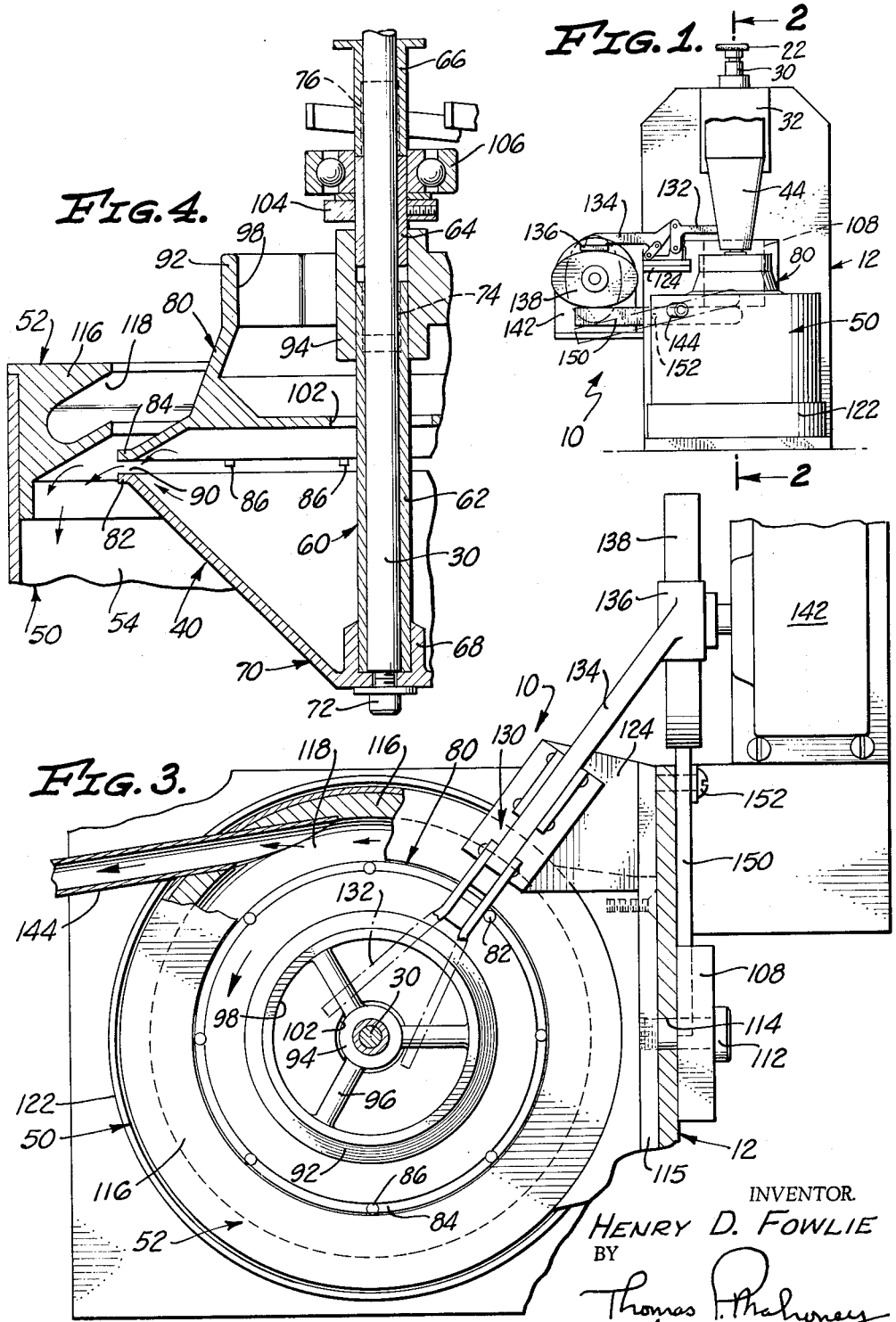
INVENTOR.
HENRY D. FOWLIE
BY
Thomas P. Mahoney
ATTORNEY Feb. 8, 1966  H. D. FOWLIE  3,233,535
CENTRIFUGAL COFFEE BREWER
Filed Dec. 27, 1962  2 Sheets-Sheet 2
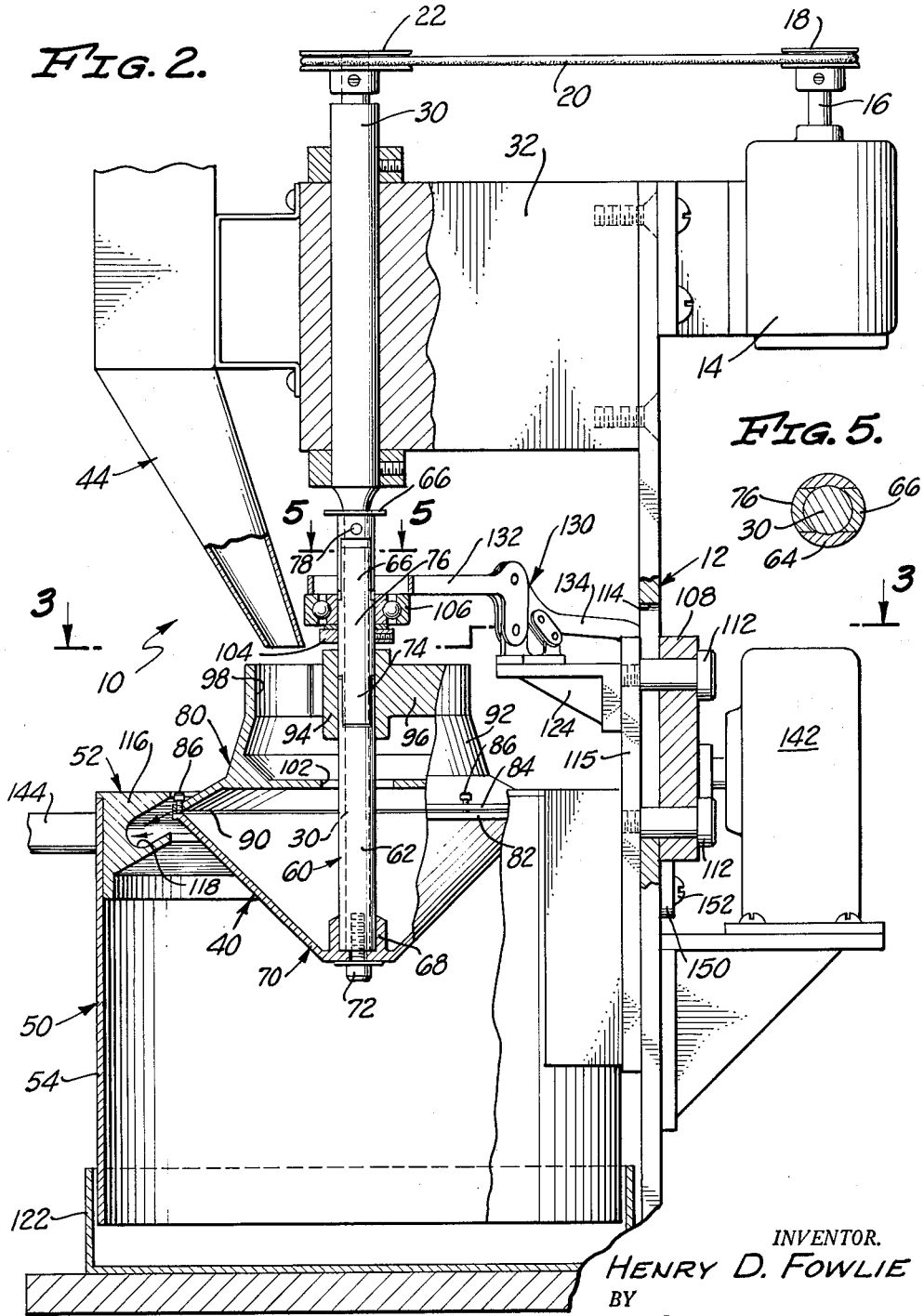
INVENTOR.
HENRY D. FOWLIE
BY
Thomas P. Mahoney
ATTORNEY 3,233,535
CENTRIFUGAL COFFEE BREWER
Henry D. Fowlie, Fallbrook, Calif., assignor, by mesne assignments, to Havajava Manufacturing Company, Clayton, Mo., a corporation of Missouri
Filed Dec. 27, 1962, Ser. No. 247,655
6 Claims. (Cl. 99—289)

This invention relates to a coffee brewer adapted for the substantially instantaneous brewing of coffee and, more particularly, to a coffee brewer particularly adapted for the instantaneous brewing of single cups of coffee.

One of the major problems encountered in the coffee brewing art and, more particularly, that segment of the art confined to automatic coffee brewers, is the provision of a cup of coffee which is equivalent in quality and flavor to that which would be provided by conventional home brewed expedients. The genesis of these problems lies in the fact that the volatile nature of the oils constituting a part of the coffee brew prevents the storage of coffee liquid in bulk for a long period of time so that it is necessary, if a palatable cup of coffee is to be provided, to instantaneously brew coffee at the time of demand.

It is, therefore, an object of my invention to provide a coffee brewer which is characterized by the fact that it will brew one or more cups of coffee during a very short time cycle with said coffee being characterized by the absence of excessive fines and by a flavor comparable, if not superior to, conventionally brewed coffee.

Another object of my invention is the provision of a coffee brewer which operates on the centrifugal principle and which is adapted to utilize various grinds of coffee without the necessity for modification of the brewing construction. This is attributable to the fact that, as will be apparent from the description of the coffee brewer appearing hereinbelow, the coffee grounds themselves are utilized as the filter element and serve, because of the centrifugal impaction thereof, as a filter element despite the fineness or coarseness of the grounds.

Another object of my invention is the provision of a coffee brewer which is characterized by the incorporation of a rotatable container adapted to receive ground coffee and hot water from suitable sources thereof and which incorporates a variable orifice through which the coffee liquor can be discharged by centrifugal force during rotation of the container.

An additional object of my invention is the provision of a centrifugal coffee brewer of the aforementioned character wherein the aforesaid container is constituted by two major components or parts which are movable relative to each other and which have juxtaposed portions defining the aforesaid variable orifice. During the coffee brewing cycle, the container is rotated with the variable orifice adjusted to an opening which will prevent the discharge of coffee grounds therethrough, but which will permit the discharge of coffee liquor from the container. After the brewing cycle is completed, the opening of the variable orifice is increased to permit the automatic discharge of coffee grounds remaining in the container therefrom and into a suitable waste receptacle.

Another object of my invention is the provision of a coffee brewer of the aforementioned character wherein there is associated with the aforesaid container a collector adapted to collect the coffee liquor discharged from the container and to conduct it to a suitable receptacle.

A further object of my invention is the provision of a coffee brewer of the aforementioned character wherein the aforesaid collector is constituted by a collector ring having an annular orifice adapted to be juxtaposed to the variable orifice of the container whereby, as the container is rotated at high speeds the coffee liquor will be discharged into said collector ring.

An additional object of my invention is the provision of a coffee brewer of the aforementioned character wherein a second collector is provided for collecting coffee grounds from the container after the completion of the brewing cycle, said second collector and said container being movable relative to each other in order that the variable orifice of said container may be displaced from operative relationship with the first collector for coffee liquor and disposed in operative relationship with said second collector.

Another object of my invention is the provision of a method of brewing coffee which includes the steps of depositing a charge of ground coffee and hot water in a centrifugal container having a perimetrical orifice; rotating said container at high speeds to cause the impaction of the coffee grounds adjacent the orifice and the discharge of the hot water through the impacted coffee grounds to provide a coffee liquor; and the additional step of collecting said coffee liquor in a suitable collector.

Another step of the method includes the subsequent widening of the orifice of the container in order to permit the centrifugal discharge of the coffee grounds therefrom after completion of the brewing cycle.

Other objects and advantages of the invention will be apparent from the following specification and the accompanying drawings, which are for the purpose of illustration only, and in which:

FIG. 1 is a front elevational view of an embodiment of the coffee brewer of the invention;

FIG. 2 is an enlarged, vertical, sectional view taken on the broken line 2—2 of FIG. 1;

FIG. 3 is a transverse, sectional view taken on the broken line 3—3 of FIG. 2;

FIG. 4 is an enlarged, fragmentary, sectional view; and

FIG. 5 is a transverse, sectional view taken on the broken line 5—5 of FIG. 2.

Referring to the drawings, and particularly to FIGS. 1 and 2 thereof, I show a coffee brewer 10 constructed in accordance with the teachings of my invention, said coffee brewer including a frame 12 adapted to support the various components thereof. It will be understood by those skilled in the art that the coffee brewer 10 may be incorporated in any suitable type of housing and associated with any suitable type of coin mechanism in order that it may function as a coffee vending machine but, it is, of course, not intended that the teachings of the invention be limited to any particular type of application since, as will be apparent to those skilled in the art, the principles of the invention may be applied with equal cogency to a wide variety of different types of applications. For instance, the coffee brewer of the invention may be applied in the brewing of coffee in restaurants or in homes.

Mounted upon the support 12, as best shown in FIG. 2 of the drawings, is an electrical drive motor 14 adapted to rotate a shaft 16 having a sheave 18 secured to the upper extremity thereof. Entrained upon the sheave 18 is a belt 20 which is also entrained upon a corresponding sheave 22 secured to the upper extremity of a drive shaft 30.

The drive shaft 30 is mounted in a bearing block 32 which is secured to the support 12.

Operatively connected to the lower extremity of the drive shaft 30, in a manner to be described in greater detail below, is a brewing container 40. Supported in proximity to the upper extremity of the brewing container 40 is a hopper 44 adapted to deliver ground coffee and hot water from appropriate sources, not shown, to the brewing container 40.

The brewing container 40 is rotatable by the drive shaft 30 within an enclosure 50 which provides a first collector 52 and a second collector 54 adapted, respectively, to collect coffee liquor from the brewing container 40 during the brewing process and, after the completion of the brewing process, to collect waste coffee grounds from the container 40.

Encompassing the lower extremity of the drive shaft 30 is a composite sleeve 60 consisting of a lower, fixed portion 62, an intermediate movable portion 64, and an upper, fixed portion 66. The lower portion 62 has its lower extremity fitted, by a press fit, into a cylindrical boss 68 formed in the bottom of the lower part 70 of the brewing container 40, said lower part being affixed, in turn, to the lower extremity of the drive shaft 30 by means of a bolt 72.

The upper extremity of the lower portion 62 of the sleeve 60 is connected to the lower extremity of the intermediate portion 64 of the sleeve 60 by means of a spline connection 74, which, as best shown in FIGS. 2 and 4 of the drawings, permits relative movement of the intermediate portion 64 of the sleeve 60 with respect to the lower portion 62 and upper portion 66 thereof. Similarly, the upper portion 66 of the sleeve 60 is connected to the intermediate portion 64 by means of a spline connection 76, the upper portion 66 being fixedly connected to the shaft 30 by means of a set screw 78. Operatively connected to the intermediate, movable portion 64 of the sleeve 60, as by means of a press fit, is the upper part or portion 80 of the brewing container 40.

The lower portion 70 of the brewing container 40 is formed in the shape of a frusto cone and is provided with a perimetrical flange 82 which is juxtaposed to a corresponding perimetrical flange 84 on the upper part 80 of the brewing container 40. Threadedly engaged in the flange 84 of the upper part 80 are adjustment screws 86 which are adapted to serve as spacers to maintain the flanges 82 and 84 in spaced relationship with each other to define a variable discharge orifice 90 between said flanges.

The upper part 80 of the brewing container 40 includes an upwardly oriented skirt 92 which incorporates a mounting hub 94 secured thereto by means of spokes 96, said hub, as previously indicated, being operatively connected to the intermediate movable portion 64 of the sleeve 60 by a press fit.

The skirt 92 defines an inlet passage 98, as best shown in FIGS. 2 and 4 of the drawings, for the reception of ground coffee and hot water from the lower extremity of the hopper 44. A centrally located opening 102 in the upper part 80 of the brewing container 40 permits the ground coffee and hot water to flow downwardly into the lower part 70 of the brewing container 40.

Secured in encompassing relationship with the intermediate movable portion 64 of the sleeve 60 is a bearing collar 104 which, as best shown in FIGS. 2 and 4 of the drawings, supports a ball bearing 106 whose inner race is fixed to the upper extremity of the movable portion 64 of the sleeve 60, for a purpose which will be described in greater detail below.

The enclosure 50 is of cylindrical configuration and is secured to the support 12 by means of a movable block 108 which incorporates bolts 112, as best shown in FIG. 3 of the drawings, extending through an elongated slot 114 in the support 12 and engaging a mounting bracket 115 secured to the enclosure 50. The first collector 52 is constituted by an annular collector ring 116, which, as best shown in FIGS. 2 and 4 of the drawings, incorporates an annular collecting groove 118 and which is mounted at the upper extremity of the enclosure 50. Disposed in overlying relationship with the lower extremity of the enclosure 50 is a waste receptacle 122, as best shown in FIG. 2 of the drawings.

Mounted upon the support 12 on a bracket 124, as best shown in FIGS. 1–3 of the drawings, is a means 130 adapted to permit varying of the variable orifice 90 between the abutting flanges 82 and 84 of the lower and upper parts 70 and 80, respectively, of the brewing container 40. The means 130, as best shown in FIGS. 2 and 3 of the drawings, includes a pivotally mounted yoke 132 which is adapted to be raised and lowered by means of a lever 134. The yoke 132 is pivotally mounted at one end on the bracket 124 and is hingedly connected to the lever 134, which also is linked to the bracket 124. The lever 134 incorporates a shoe 136 adapted to ride upon the perimeter of a cam 138 which is, as best shown in FIGS. 1 and 2 of the drawings, driven by a synchronous timer motor 142. When the cam 138 is in the phantom position of FIG. 1, the lever 134 is rocked forward through its linkage to the bracket 124 and pulls the yoke 132 around its pivotal connection to the bracket 124 to raise the yoke 132 and condition the container top 80 for movement upwardly when the container 80 is rotated to open the orifice 90 to its open position.

The yoke 132 is engageable with the ball bearing 106 and, when disposed in the lowermost position shown in FIG. 2 of the drawings, is adapted to maintain the bearing 106 and the intermediate movable portion 64 of the sleeve 60 in the lowermost position of FIG. 2 wherein the upper portion or part 80 of the brewing container 40 is located in close relationship to the lower part 70 thereof in order that the discharge orifice 90 may be maintained at an optimum dimension for brewing coffee and discharging the coffee liquor therethrough into the annular collector ring 116. It will be noted that the collector ring 116 has a discharge conduit 144 communicating therewith which is adapted to discharge coffee liquor into an appropriate receptacle, such as a cup, or the like.

Operatively connected to the traveling block 108 which mounts the enclosure 50 for vertical movement of the support 12 is a lever 150 which is pivotally connected by a screw 152 intermediate its extremities to the support 12, as best shown in FIGS. 1 and 3 of the drawings. The other extremity of the lever 150 is engaged upon the side of the cam 138 opposite the lever 134.

When the cam 138 is in the position shown in full lines in FIG. 1 of the drawings, the yoke 132 is disposed in its lowermost position, as best shown in FIG. 2 of the drawings, to hold the upper part 80 of the brewing container 40 in its lowermost position and the lever 150 is located in the full line position of FIG. 1 in which the enclosure 50 is so located as to juxtapose the collector ring 116 to the variable discharge orifice 90 of the container 40.

Consequently, when the container 40 is rotated by energization of the motor 14 after the deposition of ground coffee and hot water into the container 40 from the hopper 44, the centrifugal force will throw the coffee grounds toward the variable orifice 90. The coffee grounds will thus be impacted at the perimeter of the container 40 immediately adjacent the discharge orifice 90 and the hot water will be slung through the coffee grounds and the discharge orifice 90 into the annular groove 118 of the collector ring 116. A pumping action is generated which causes the coffee liquor to be discharged through the discharge pipe or conduit 144.

After the completion of the brewing cycle, the motor 14 is de-energized, and the timer motor 142 is energized to rotate the cam 138 into the phantom position of FIG. 1 of the drawings wherein the lever 134 is raised to cause corresponding upward movement of the yoke 132. Simultaneously, the extremity of the lever 150 in engagement with the cam 138 is depressed to cause the inner extremity thereof which engages the traveling block 108 to be raised. This causes corresponding upward movement of the traveling block 108 and upward movement of the enclosure 50 into the position shown in FIG. 4 of the drawings wherein the variable discharge orifice 90 is juxtaposed to the second collector 54 constituted by the cylindrical wall of the enclosure 50.

Once again, the motor 14 is energized to rotate the brewing container 40. The centrifugal force exerted against the coffee grounds causes the upper part 80 of the brewing container 40 to move upwardly and permit the coffee grounds to be radially discharged through the discharge orifice 90 into the second collector 54. From the second collector 54, the grounds fall into the waste container 122.

Because of the extreme efficiency of the coffee brewer 10, the utilization of rinse water is eliminated because the coffee grounds can be discharged from the brewing container 40 without the use of rinse water. Therefore, the necessity for the provision of the large and noisome waste containers conventionally incorporated in automatic coffee brewers is eliminated.

Moreover, due to the fact that the ground coffee is impacted against the variable orifice 90 during the brewing cycle, the resulting coffee liquor is characterized by an absence of the muddy fines which frequently are found in coffee liquor brewed by ordinary automatic processes.

After the completion of the cleansing or discharge cycle, the timer motor 142 returns the levers 134 and 150 into the positions assumed during the brewing process and the cycle is ready to be initiated once again. There is thus provided by my invention, a centrifugal coffee brewer which is characterized by its relative simplicity of construction, ease of operation and the excellent coffee which results from the utilization thereof. Moreover, because of the coffee brewing method utilized, it is not necessary to prepare a special grind of coffee as is frequently the case with conventional coffee brewing machines. Since the variable orifice 90 can be adjusted by the adjustment of the screws 86, any suitable grind of coffee can be utilized.

I claim:
1. A coffee brewer comprising
  (a) a rotatable shaft,
  (b) two hollow mating brewing container parts rotatable with the shaft, said parts having peripheral lips, means for spacing said lips to define a smallest orifice therebetween, one of said parts being longitudinally movable with respect to the other to vary the size of the orifice between said lips, said container parts defining a wedge shaped internal space adjacent to the inner edge of the peripheral lips,
  (c) means for rotating the shaft,
  (d) means for injecting hot water and ground coffee into the container parts,
  (e) the coffee grounds being impacted into the wedge shaped space upon rotation of the parts,
  (f) a pair of spaced collectors circumscribed about the outer edges of the container lips, said collectors being movable in unison relatively longitudinally with respect to the container lips,
  (g) hold down means for holding the container parts in the smaller orifice size during rotation of the container parts to retain the ground coffee within the wedge shaped space, the first of said collectors being juxtaposed to the smaller orifice opening,
  (h) means for conditioning the container parts so that further rotation thereof will cause the impacted ground coffee to move the container parts apart and cause the orifice to assume its larger size, and
  (i) means for moving the second of the collectors into juxtaposition with the larger orifice opening.

2. The structure of claim 1 including means for adjustably predetermining the spacing between the lips when at their smaller opening to allow various grinds of coffee to be used in the brewer.

3. A coffee brewer comprising
  (a) a rotatable shaft,
  (b) two hollow mating brewing container parts fixed to the shaft, said parts having converging smooth internal surfaces terminating in peripheral lips to define a wedge shaped internal space adjacent to the lips, means for positively spacing the lips to define a smaller size orifice, one of said parts being longitudinally movable with respect to the other to vary the size of the orifice between said lips,
  (c) means for injecting hot water and ground coffee into the container parts,
  (d) drive means for rotating the shaft,
  (e) the coffee grounds being impacted into the wedge shaped space upon rotation of the container parts,
  (f) a pair of spaced longitudinally movable collectors circumscribed about the outer edges of the container lips,
  (g) hold down means for holding the container parts in the smaller orifice size during rotation of the container parts to retain the ground coffee within the wedge shaped space, the first of said collectors being juxtaposed to said container parts when in their smaller orifice size to collect the brewed coffee from said smaller orifice,
  (h) means for releasing the hold down means to condition the container parts so that further rotation thereof will cause the wedge shaped impacted ground coffee to move the container parts apart and cause the orifice to assume its larger size, and
  (i) means for moving the second of the collectors into juxtaposition with the larger orifice opening to collect the coffee grounds from the larger orifice opening.

4. The structure of claim 3 wherein the means for positively spacing the lips is adjustable to vary the smaller orifice size.

5. A coffee brewer comprising
  (a) rotatable shaft,
  (b) two hollow vertically aligned mating brewing container parts rotatable with the shaft, said parts having peripheral lips, means for spacing said lips to define a smaller orifice therebetween, one of said parts being longitudinally movable with respect to the other to vary the size of the orifice between said lips, said container parts defining a wedge shaped internal space adjacent to the inner edge of the peripheral lips,
  (c) first drive means for rotating the shaft,
  (d) means for energizing and deenergizing the first drive means,
  (e) means for injecting hot water and ground coffee into the container parts,
  (f) the coffee grounds being impacted into the wedge shaped space upon rotation of the parts,
  (g) a pair of spaced collectors circumscribed about the outer edge of the container lips, said collectors being longitudinally movable in unison,
  (h) hold down means engaging the uppermost container for holding the container parts in the smaller orifice size during rotation of the container parts to retain the ground coffee within the wedge shaped space, the first of said collectors being juxtaposed to the smaller orifice opening,
  (i) second drive means,
  (j) a cam driven by the second drive means,
  (k) said hold down means engaging the cam and movable therewith, and
  (l) means for raising the collectors also engaging the cam and movable therewith,
  (m) said cam being formed so that movement thereof releases the hold down means from engagement with the uppermost container to condition the container parts so that further rotation thereof will cause the impacted ground coffee to move the container parts apart and cause the orifice to assume its larger size, and simultaneously raises the collectors so that the second collector is in juxtaposition with the larger orifice opening.

6. The structure of claim 5 wherein the means for spacing the lips is adjustable to allow various grinds of coffee to be used in the brewer.

References Cited by the Examiner

UNITED STATES PATENTS

| | | | |
|---|---|---|---|
| 686,917 | 11/1901 | Baker. | |
| 745,696 | 12/1903 | Kirk | 233—20 |
| 1,381,330 | 6/1921 | Pechstein | 233—20 X |
| 1,404,157 | 1/1922 | Mauss | 210—370 |
| 1,869,720 | 8/1932 | Strand | 99—289 X |
| 2,149,270 | 3/1939 | Burgess | 990—289 X |
| 2,387,871 | 11/1945 | Baumann | 99—289 |
| 2,562,206 | 7/1951 | Nutting | 99—71 |
| 2,563,233 | 8/1951 | Gilmont | 99—71 |
| 2,589,221 | 3/1952 | Burgess | 99—289 |
| 2,589,335 | 3/1952 | Burgess | 99—289 X |
| 2,898,843 | 9/1959 | Rockriver | 99—289 |

FOREIGN PATENTS

| | | |
|---|---|---|
| 621,908 | 11/1935 | Germany. |

CHARLES A. WILLMUTH, *Primary Examiner.*

JOSEPH D. BEIN, ROBERT E. PULFREY, *Examiners.*